April 21, 1959

S. CONVERSE 2,883,115

SPRAYING APPARATUS

Filed June 18, 1956

SHERMAN CONVERSE,
INVENTOR.

BY Eaton, Bell, Hunt + Seltzer

ATTORNEYS

April 21, 1959
S. CONVERSE
2,883,115
SPRAYING APPARATUS
Filed June 18, 1956
2 Sheets-Sheet 2
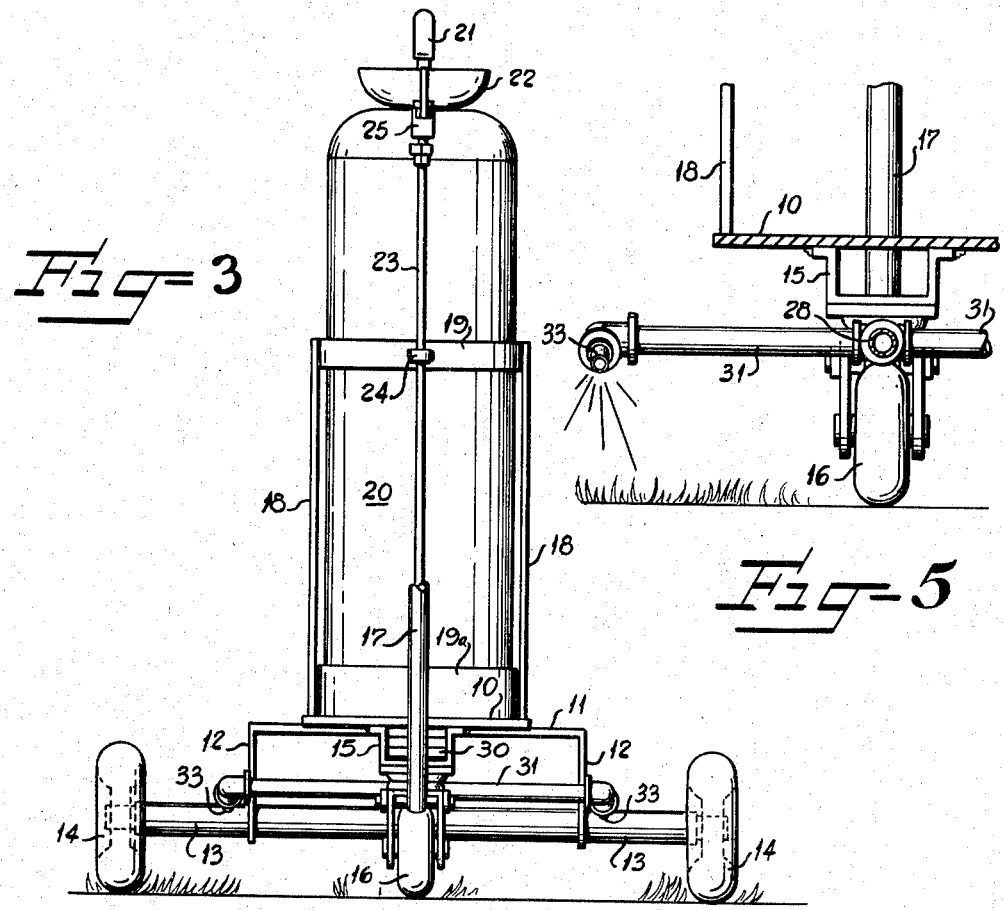
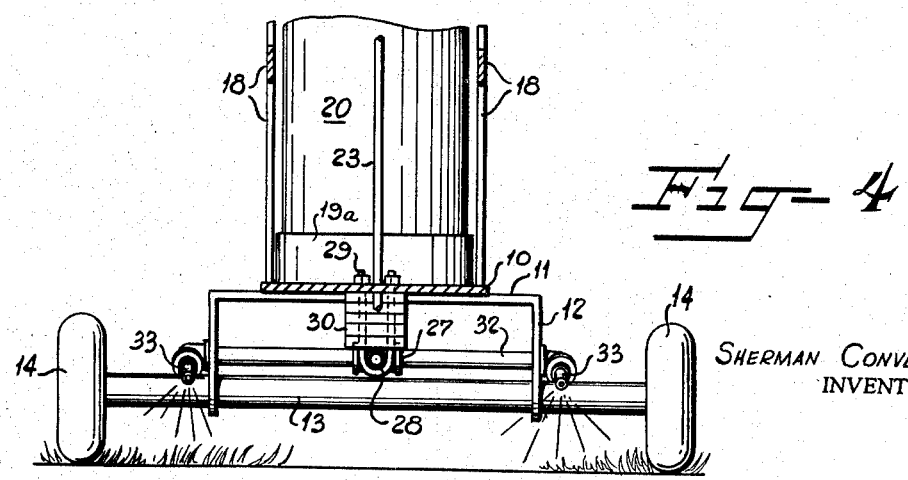
SHERMAN CONVERSE,
INVENTOR.
BY Eaton, Bell, Hunt & Seltzer
ATTORNEYS United States Patent Office 2,883,115
Patented Apr. 21, 1959

2,883,115

SPRAYING APPARATUS

Sherman Converse, Graniteville, S.C., assignor to Graniteville Company, Graniteville, S.C., a corporation of South Carolina Application June 18, 1956, Serial No. 592,022

2 Claims. (Cl. 239—172)

This invention relates to a wheeled spraying carriage and is designed primarily for spraying paint on yards and lawns.

The principal object of the invention is to provide apparatus for spraying grass with green paint and so constructed as to spray the underside of the grass blades as well as the top and to give a more uniform coverage and distribution of the paint on the grass. When lawn grass has become dead or brown it may be given a live appearance by the use of the apparatus herein described, by spraying green paint on the grass to give it the appearance of a green yard or lawn.

Spraying devices heretofore known have not been of such construction as to permit the underside of the blades of grass to be sprayed as well as the top. Furthermore, devices heretofore have not enabled the paint to be distributed in such a manner as to give a uniform coverage. In this device spraying nozzles are so directed as to spray the underside as well as the top of the grass. In order to spray effectively the lawn in this manner spraying nozzles are positioned close to the earth and adapted to be adjusted from one and one-half inches to four inches above the earth. The angle of the spray nozzles is adjustable from parallel to the ground to forty-five degrees. An angle of fifteen degrees with respect to the earth is preferable. Spraying nozzles are positioned both at the front and at the rear and directed toward each other so that the spray will be directed forwardly and rearwardly of the direction of travel of the carriage.

A manually propelled carriage is provided on which is mounted a container for the spray compound which in this instance may be green paint. An air pump subjects the spray in the container to pressure. A valve is provided for controlling the spraying material to spray nozzles. The nozzles are so mounted as to be adjustable to direct the spray at any angular relation with respect to the ground.

Some of the objects of the invention having been stated, other objects will appear as the description proceeds when taken in connection with the accompanying drawings in which—

Figure 3 is a front view in elevation;

Figure 4 is a section on line 4—4 of Figure 1;

Figure 5 is a section on line 5—5 of Figure 1 showing one side of the apparatus.

Figure 1:
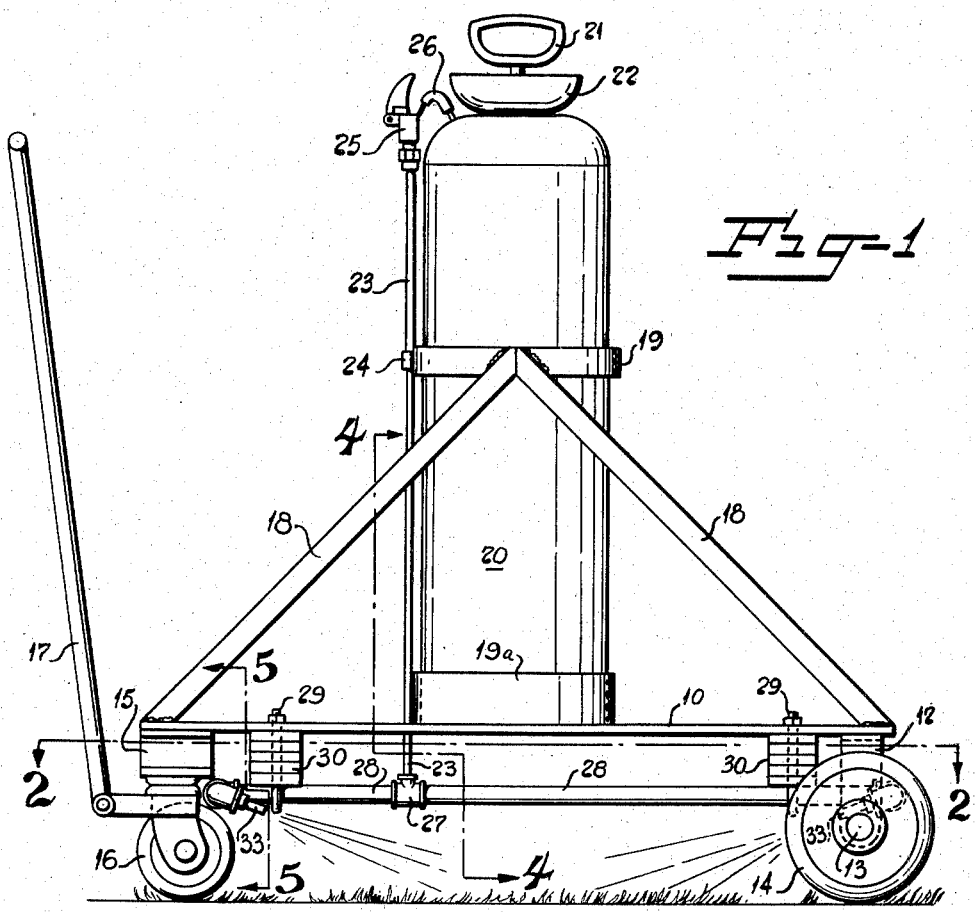
Figure 1 is a side elevation of the machine showing the apparatus in use.
Figure 2:
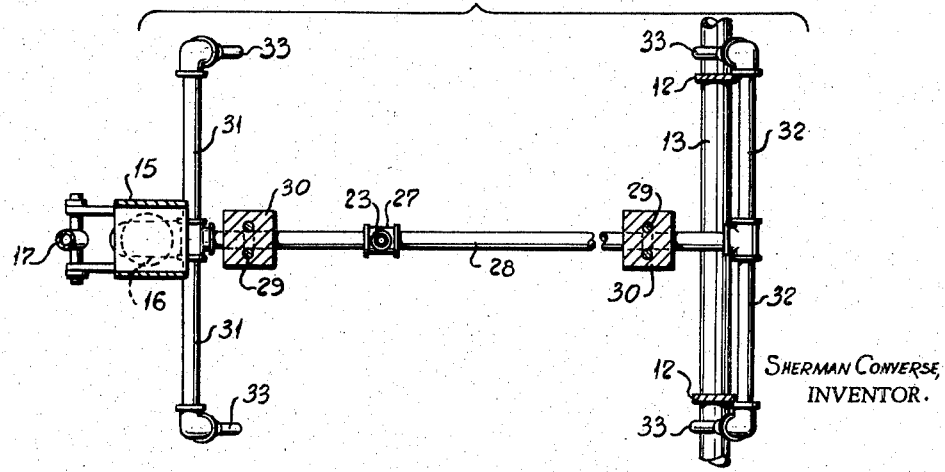
Figure 2 is a section on line 2—2 of Figure 1 showing parts of the apparatus.

The spraying support comprises a carriage having a body portion consisting of a flat top or plate 10 having at its rear end a strap 11, the strap being bent down at its ends 12 and having a rear axle 13 secured therein as by welding, the axle carrying relatively small rear wheels 14 rotatably mounted thereon. An inverted cup-shaped member 15 is secured to the underside of the front of the plate 10 and carries a relatively small caster 16. A handle or tongue 17 is provided for pulling the carriage.

While a manually propelled carriage is shown on which the spraying apparatus is mounted, it is to be understood that a motor drawn carriage could be used in the event that the spray is to be used on a large lawn or perhaps on a golf green.

The plate 10 has a ring or band 19a fixed thereupon in which a container 20 seats. The container has therearound a band 19 to which are attached braces 18, the braces being secured to the plate 10. These braces appear in the form of an inverted V as shown. The container has mounted therein an air pump not shown of conventional construction which is operated by a handle 21. It is apparent that a motor operated pump may be employed if desired in lieu of a manual pump. In such an event, the same motor could be used for propelling the carriage if desired.

A cap 22 may be secured by threading into the upper end of the container and may be removed for filling the container with paint. A pipe 23 extends down the side of the container and is secured at 24 to the band 19. The pipe 23 has a manually operated valve 25 on its upper end. A short rubber hose 26 or other conduit connects the valve to the container.

The pipe 23 is connected at its lower end to a T-coupling 27 in a pipe or manifold 28 extending longitudinally of the carriage. By means of U-bolts 29 the manifold 28 is supported beneath the plate 10, spacing blocks 30 being provided between the manifold 28 and the underside of the plate 10 so that the manifold may be spaced close to the ground. The manifold 28 is connected by means of T-couplings to transverse pipes 31 and 32 at the front and rear of the body of the carriage. The ends of the pipes 31 and 32 preferably have L-couplings adjustably secured thereon into which spray nozzles 33 are secured. If desired the L-couplings may be positioned parallel to the ground or up to an angle of forty-five degrees therewith so that spray from the nozzles may be delivered at any desired angle toward the grass. As stated previously, it is preferable to have the nozzles positioned at about a fifteen degree angle to the ground to obtain a more uniform coverage and distribution of the paint. However, the nozzles are adjustable from four inches to one and one-half inches with respect to the earth to permit them to be disposed parallel thereto or up to forty-five degrees.

From the foregoing the operation of the spraying apparatus should be apparent. The container 20 is filled with spray material, preferably green paint. Air pressure is supplied to the top of the spray by means of a pump. By operation of the valve 25 the spray that is in the container may be directed through the pipe 23 to the manifold 28 and to the pipes 31 and 32 at the front and rear of the vehicle, and through the nozzles 33 to uniformly apply the green paint both to the tops and undersides of the grass.

In the drawings and specification there has been set forth a preferred embodiment of the invention, and although specific terms are employed they are used in a generic and descriptive sense only and not for purposes of limitation, the scope of the invention being defined in the claims.

I claim:

1. Apparatus for spraying grass with green paint comprising a carriage having a flat plate thereon, a paint container mounted on said plate, a support for said container, said support comprising a ring on the plate within which the container is adapted to be seated, a band around said container, and supporting braces attached to said plate and to said band, a strap across the rear of said plate, said strap being bent down at its ends, a rear axle supported in said ends, wheels on the axle, a caster supported beneath the front end of the plate, transverse pipes supported beneath the front and rear ends of the plate, nozzles supported in the ends of said pipes, said nozzles being directed downwardly at approximately a fifteen degree angle to the earth, a manifold extending longitudinally of the plate and connected midway of the ends of said transverse pipes, spacing blocks supported beneath said plate, said manifold being supported beneath said blocks to position it relatively close to the earth, a pipe connecting said manifold with the paint container and a valve in said last-named pipe.

2. Apparatus for spraying grass with green paint comprising a carriage having a flat plate thereon, a paint container mounted on said plate, a support for said container, said support comprising a ring on the plate within which the container is adapted to be seated, a band around said container, and supporting braces attached to said plate and to said band, a strap across the rear of said plate, said strap being bent down at its ends, a rear axle supported in said ends, wheels on the axle, a caster supported beneath the front end of the plate, transverse pipes supported beneath the front and rear ends of the plate, nozzles adjustably supported in the ends of said pipes, the nozzles on the rear transverse pipe being directed forwardly and the nozzles on the front transverse pipe being directed rearwardly of the carriage, the range of adjustment of said nozzles extending from nozzle positions parallel to the earth downwardly up to an angle of not more than 45° with respect to the earth, a manifold extending longitudinally of the plate and connected midway of the ends of said transverse pipes, spacing means supported beneath said plate, said manifold being supported beneath said spacing means to position it relatively close to the earth, a pipe connecting said manifold with the paint container, and a valve in said last-named pipe.

References Cited in the file of this patent

UNITED STATES PATENTS

| | | |
|---|---|---|
| 1,184,997 | Rowes et al. | May 30, 1916 |
| 1,326,726 | Halsey | Dec. 30, 1919 |
| 1,883,479 | Bateman | Oct. 18, 1932 |
| 2,317,288 | McCubin | Apr. 20, 1943 |
| 2,507,524 | Hughes | May 16, 1950 |
| 2,684,123 | Mattis | July 20, 1954 |
| 2,740,664 | Yates | Apr. 3, 1956 |
| 2,812,211 | Gardner | Nov. 5, 1957 |